April 30, 1957    H. G. FEISSEL    2,790,900
PULSE GENERATOR AND DISTRIBUTOR
Filed July 2, 1952    4 Sheets-Sheet 1
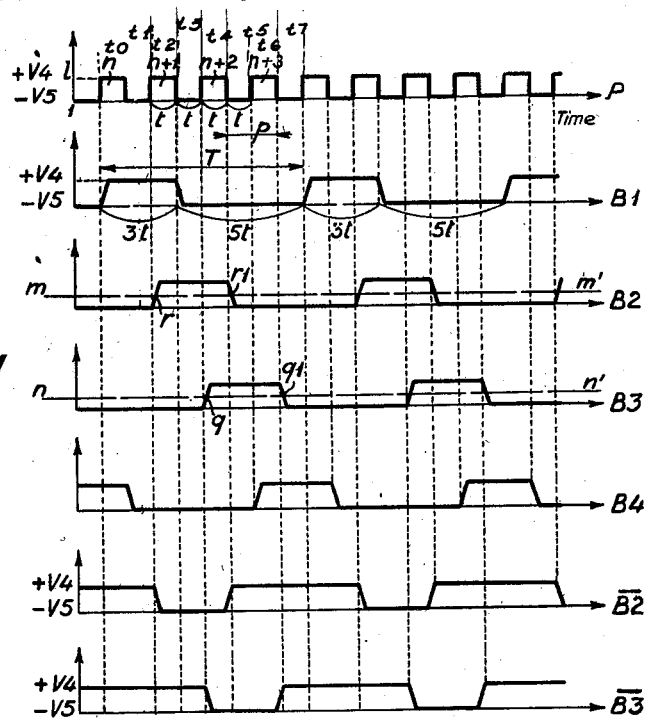
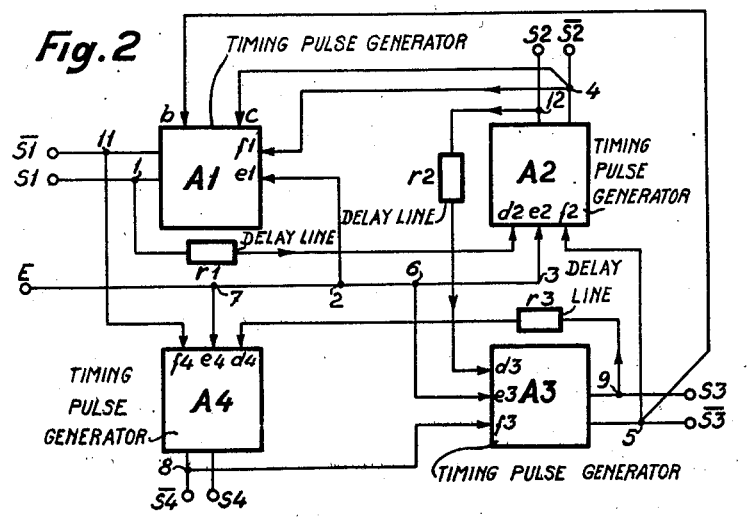

April 30, 1957 H. G. FEISSEL 2,790,900
PULSE GENERATOR AND DISTRIBUTOR
Filed July 2, 1952 4 Sheets-Sheet 3

United States Patent Office 2,790,900
Patented Apr. 30, 1957

2,790,900

PULSE GENERATOR AND DISTRIBUTOR

Henri Gérard Feissel, Paris, France, assignor to Compagnie des Machines Bull (Societe Anonyme), Paris, France Application July 2, 1952, Serial No. 296,967

Claims priority, application France July 6, 1951

6 Claims. (Cl. 250—27)

The present invention concerns an impulse generating system receiving periodical pilot pulses through one particular controlling channel, or path and supplying a number N of trains of timing impulses.

These impulse trains, called timing trains should have the same period of recurrence T, same duty cycle and any of them should be delayed with respect to the other by time intervals equal to a fraction T/N of this period of recurrence.

This system includes a number N of devices forming the N elements of a closed chain. Each device can supply two simultaneous trains of which one, called the inverted train, is composed of negative impulses, while the other, called the timing train, is composed of positive impulses. Each element is connected to at least two of the immediately adjoining elements as well as to a pilot-pulse generator. This system is characterized by the fact that coincidence detectors associated with the various elements control their operation in such a way that they insure the emission of a pulse by a given element when a pilot impulse coincides with a determined state of operation of at least two of the following elements in the chain and that they cause the (N−1) remaining elements to respectively and successively transmit (N−1) timing impulses, each of which is produced by the coincidence of a pilot impulse and a delayed timing impulse emitted by the preceding element.

The inverted train and the timing train which are produced by any one of the elements of the chain and which are represented in function of time in a system of rectangular coordinates in Figure 1 and are symmetrical one with another in respect to an axis passing through the middle of the amplitude of the impulses.

A generator of known type supplies the above defined system under control of a train of positive square pilot impulses cyclically recurring, each having a determined length in time which is equal to ½ of each recurrence period $p$.

This system distributes trapezoidal impulses over twice N output channels, the duration of which exceeds that of the pilot impulses. By way of unrestrictive example, a description of a system producing 4 timing trains and 4 inverted trains will now be given.

The recurrence period T of the timing impulses supplied by 4 of the outputs of the system is equal to four times that of the pilot impulses and the lag of the 4 corresponding trains with respect to one of these is respectively equal to once, twice, three times and four times the recurrence period of the pilot impulses.

This system is composed of 4 elements or similar units assembled in a closed chain. Each element includes at least one electronic vacuum tube, two output channels each respectively provided for the inverted and the timing impulses, several connections with other similar elements and a feed-back circuit associated with the load of the tube and the function of which will be specified later.

The invention has as its further object a system in which each unit or element involves a device to stop timing impulses. This device responds to the coincidence of the absence of a pilot impulse with the presence of at least one inverted impulse supplied by the next element in the chain.

In the drawing:

Fig. 1 shows part of the inverted and timing impulse trains.

Fig. 2 shows a block diagram of a system of four elements.

Figure 5:
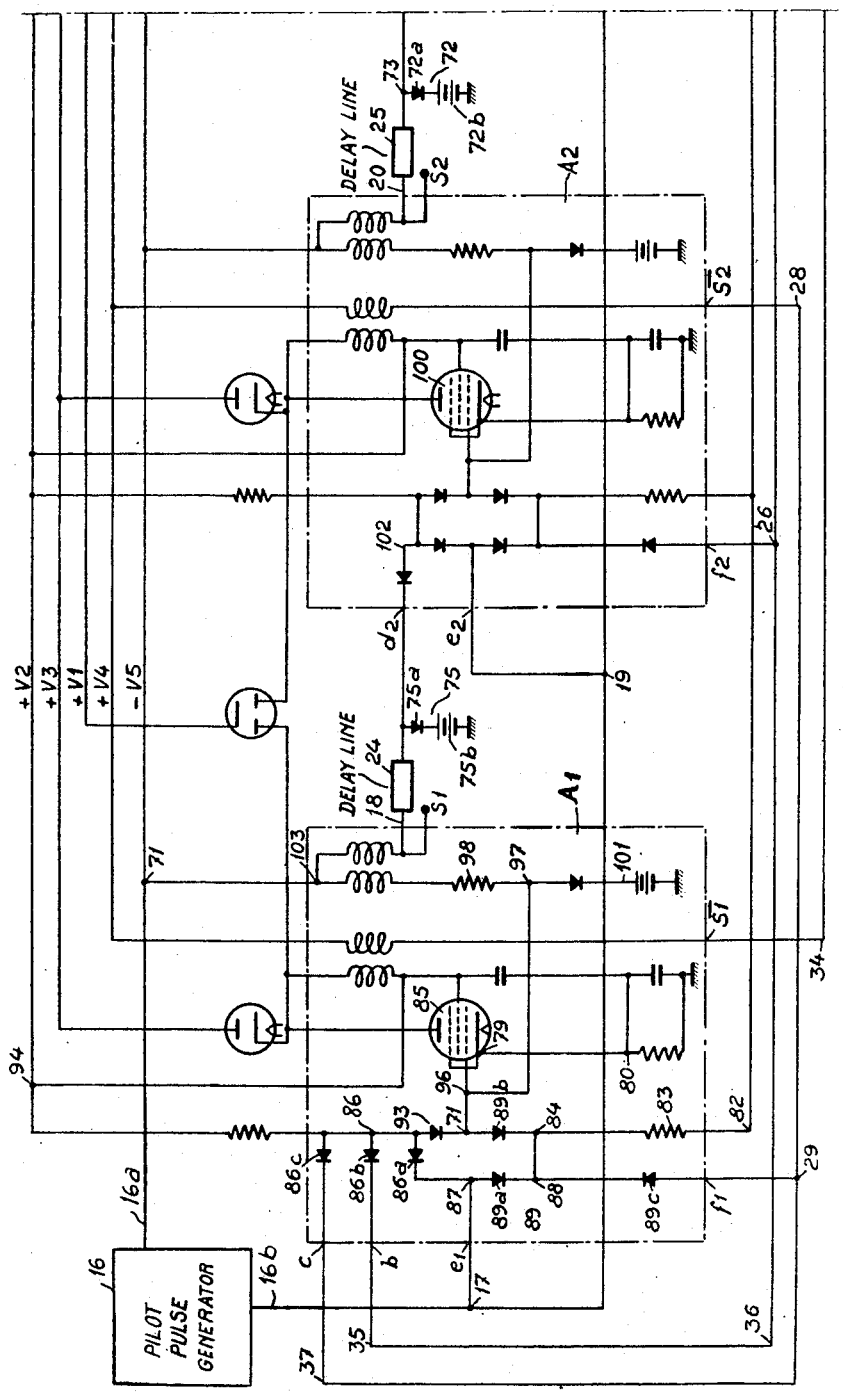
Figure 6:
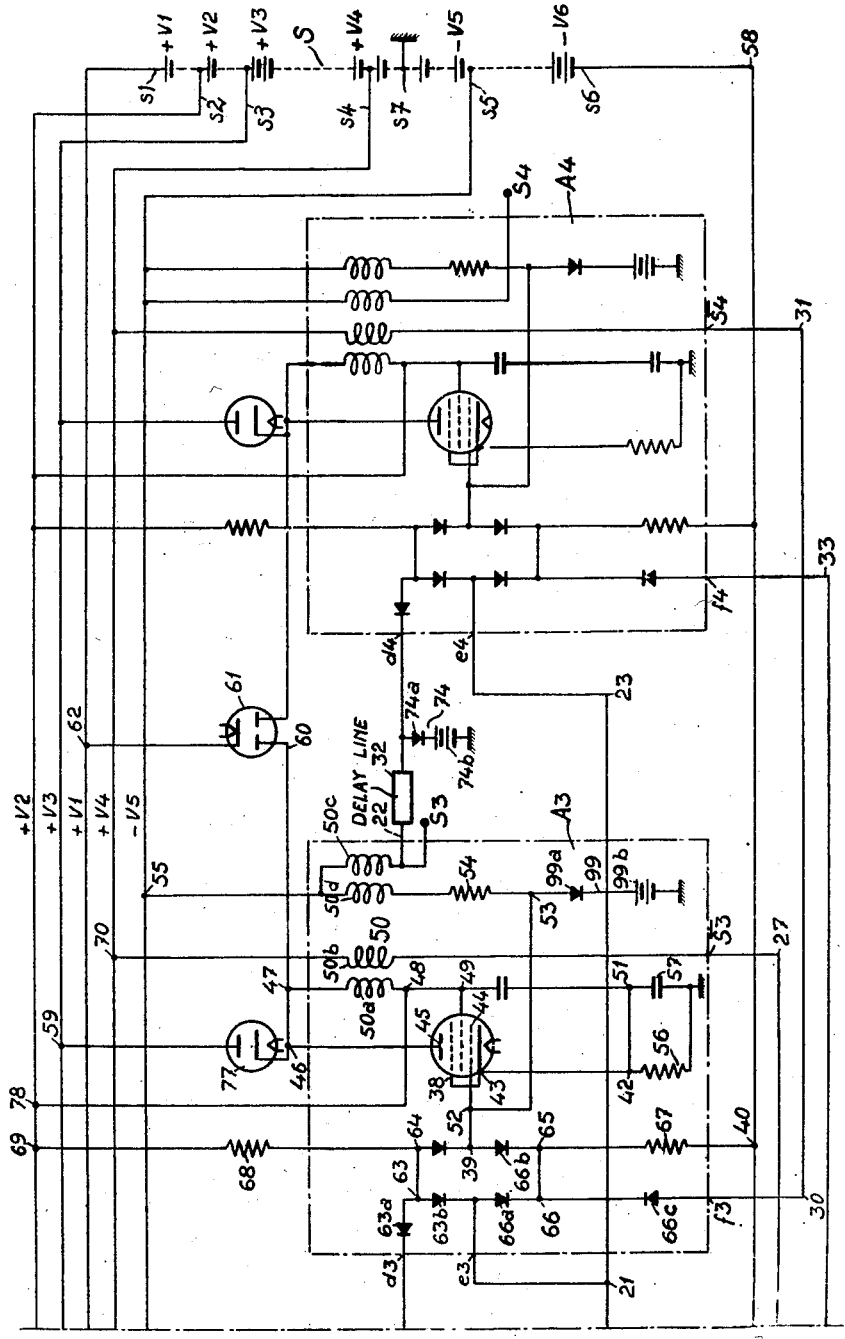

Figs. 5 and 6 taken together show a detailed arrangement of a four element system.

Figure 7:
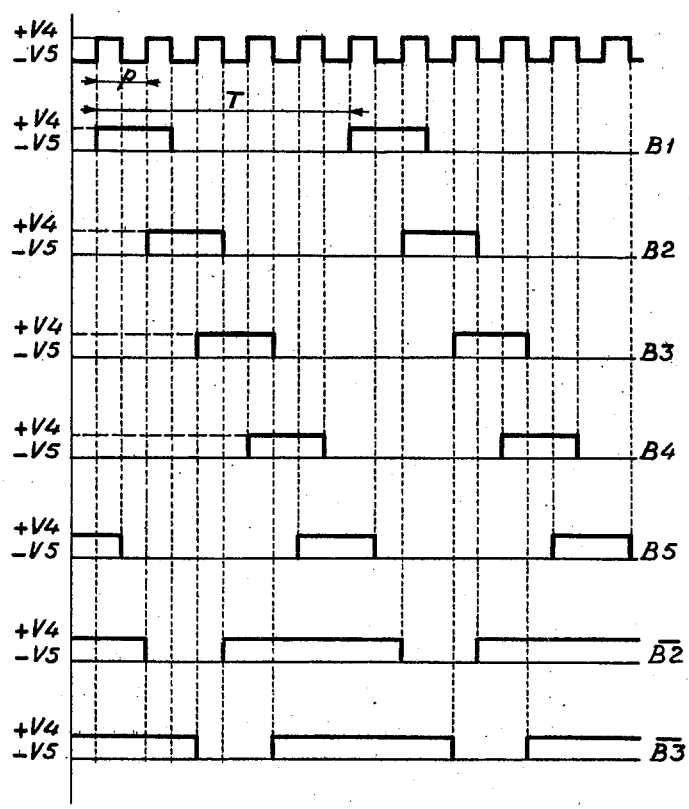

Fig. 7 shows part of the inverted and timing trains obtained by means of a five element system.

In Fig. 1, seven impulse trains may be seen. The topmost, henceforth designated as train P, represents square impulses which constitute the above referred to pilot impulses. Their recurrence period $p$ is equal to $T/4$ and their individual duration $t$ is equal to $T/8$. Their voltages vary from $+V_4$ to $-V_5$. Impulse train $B_1$, immediately under train P, represents trapezoidal timing impulses. They have a length in time of $3/8T$ or $3t$. Impulse train $B_2$, under train $B_1$, represents a second timing impulse train which should be delaysd with respect to the first one by a time interval equal to $2t$ or $p$. Train $B_3$, under train $B_2$, represents an impulse train which should be delayed with respect to train $B_2$ by a time interval also equal to $2t$. Finally, train $B_4$, under train $B_3$, represents a timing impulse train which should be delayed with respect to train $B_3$, by a time interval equal to $2t$. The voltages of these four trains vary between the same values $+V_4$, $-V_5$ as those characterizing train P. Train $\overline{B}_2$, just under train $B_4$, represents an inverted impulse train which is symmetrical with train $B_2$ in respect to an axis $mm'$ passing through the middle plots $r$ and $r_1$ of pulse $B_2$ wave fronts. Finally, inverted pulse train $\overline{B}_3$, under train $\overline{B}_2$, is obtained from train $B_3$ by symmetry in respect to axis $nn'$ passing through the middle plots $q$ and $q_1$ of $B_3$ impulse wave fronts. The wave crest voltages of pulses $B_1$ to $B_4$ and of pulses $\overline{B}_1$ to $\overline{B}_4$ are equal to $+V_4$ while the voltages at their bases are equal to $-V_5$.

Figure 3:
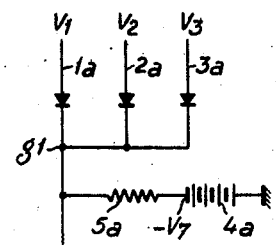
Fig. 3 shows an "or" gating device hereinafter termed "buffer."

Fig. 3 shows a buffer of a known type with 3 inputs $1a$, $2a$, $3a$, each of which comprises a rectifier cell, connected through $g_1$ and resistor $5a$ to the negative terminal, at $-V_7$ potential, of a source $4a$ whose positive terminal is grounded. The resistance of $5a$ is, for example, one thousand times that of the rectifier cells measured in the conducting direction.

If voltages whose algebraic values are much greater than $-V_7$ are applied at inputs $1a$, $2a$, $3a$, and if $V_1>V_2>V_3$, point $g_1$ automatically takes a potential slightly below $V_1$. If $V_1=V_2=V_3$, point $g_1$ remains at potential $V_1$. This is why a buffer acts as a coincidence detector whatever the number of its inputs may be.

Figure 4:
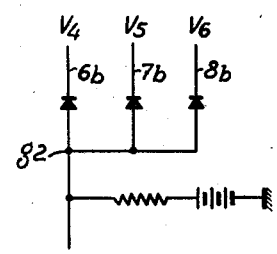
Fig. 4 shows an "and" gating device hereinafter termed "gate."

Fig. 4 shows a gate of a known type with 3 inputs $6b$, $7b$, $8b$. It differs from the buffer shown in Fig. 3 only in the poling of the cells which is reversed as are the connections between source $4a$ on one hand and ground and resistor on the other. In this arrangement if $V_4$, $V_5$, $V_6$ stand for the algebraic values of the potentials at the 3 inputs and if $V_4>V_5>V_6$, the potential $Vg_2$ at $g_2$ is automatically slightly over $V_6$. If $V_4=V_5=V_6$, $Vg_2=V_4$ which shows that a gate also acts as a coincidence detector.

The solid type rectifier cells of gates and buffers being deprived of inertia, their operation is independent of the time of voltage application at their inputs.

Fig. 2 shows four generators $A_1$, $A_2$, $A_3$, $A_4$ hereafter designated as timing impulse generators.

These generators are linked to the pilot impulse generator E respectively through leads $2-e_1$, $3-e_2$, $6-e_3$, $7-e_4$, which are connected to supply line E–7–2–6–3. They are also interconnected by means which are described hereafter. Any one of them, $A_2$ for instance, has two outputs $S_2$ and $\bar{S}_2$ which supply respectively impulse trains $B_2$ and $\bar{B}_2$ shown in Fig. 1. The simultaneous emission of timing and inverted impulses by generator $A_2$ is made possible by the delaying connection $1-d_2$ which links output $S_1$ of generator $A_1$ to input $d_2$ of device $A_2$. The holding of voltage level of these same impulses is insured by connection $5-f_2$ which links output $\bar{S}_3$ of generator $A_3$ to input $f_2$ of generator $A_2$. The simultaneous emission of timing and inverted impulses by generator $A_3$ is made possible by the delaying connection $12-d_3$ which links output $\bar{S}_2$ of generator $A_2$ to input $d_3$ of generator $A_3$. The holding of voltage level of these same impulses is obtained by means of connection $8-f_3$ linking output $\bar{S}_4$ of generator $A_4$ to input $f_3$ of generator $A_3$.

Similarly, the emission of impulse trains $B_4$ and $\bar{B}_4$ by generator $A_4$ is made possible by the delaying connection $9-d_4$ linking output $S_3$ of generator $A_3$ to the input $d_4$ of generator $A_4$. The holding of voltage level of these same impulses is obtained by connection $11-f_4$ linking output $\bar{S}_1$ of generator $A_1$ to input $f_4$. The delay lines $r1$, $r2$, $r3$ in connections $1-d_2$, $12-d_3$, $9-d_4$ have delay values which are substantially equal to $1.5t$. The simultaneous emission of a timing and of an inverted impulse by generator $A_1$ is determined by two non-delaying connections $b-5$ and $c-4$. The holding of voltage level of these impulses is obtained by connection $4-f_1$ which links output $\bar{S}_2$ of generator $A_2$ to input $f_1$ of generator $A_1$. As may be seen from the time chart of Fig. 1, it is desired that the first timing train emitted at the beginning of a recurrence cycle T be produced by generator $A_1$. This is why connections such as $c-15$ and $b-13$ are established to represent starting conditions for generator $A_1$ which are different from those for other generators $A_2$, $A_3$ and $A_4$.

Figs. 5–6 show a manner of practical realization of the simplified diagram of Fig. 2. Identical elements in Fig. 2 and Figs. 5–6 bear same reference numbers. It follows that in Figs. 5–6, we shall find the impulse generators $A_1$ (Fig. 5), $A_2$ (Fig. 5), $A_3$ (Fig. 6), $A_4$ (Fig. 6), each of which is included in a rectangular area bounded by dots and dashes. Pilot impulse generator 16 (Fig. 5) is of a known type. It is represented by a rectangle. Its upper output terminal is returned to a negative voltage $-V_5$ through line $16a$, 71, 55 to an intermediate tap in source S, and its lower output terminal $16b$ furnishes a train of pilot impulses similar to train P in Fig. 1. The lower and upper voltages of these impulses are equal to $-V_5$ and $+V_4$ voltage $+V_4$ being that of the intermediate tap $s_4$ in source S. Connections $17-e_1$, $19-e_2$, $21-e_3$ and $23-e_4$ distribute these impulses to generators $A_1$, $A_2$, $A_3$, $A_4$.

If we consider generator $A_2$, for instance, it will be seen that this generator is provided with two outputs $S_2$ and $\bar{S}_2$, the output $S_2$ being connected to an output wire 20. Timing impulse train $B_2$ is available on output $S_2$, as well as on output wire 20. This output wire 20 is connected, through delay line 25, the delay value of which is equal to $1.5t$, to input $d_3$ of generator $A_3$. Input $d_2$ of generator $A_2$ is connected to the output wire 18 of generator $A_1$ through delay line 24 which does not appreciably differ from the above-mentioned delay line 25. Outputs 18 and $\bar{S}_1$ are twin outputs and both furnish $B_1$ impulse trains. Connection $18-d_2$ corresponds to connection $1-d_2$ in Fig. 2.

Lower input $f_2$ of generator $A_2$ is connected to output $\bar{S}_3$ of generator $A_3$ through link 26—27 and thus corresponds to connection $5-f_2$ in Fig. 2.

Output $\bar{S}_2$ of generator $A_2$ is connected to input $f_1$ of generator $A_1$ through line 28—29 and so corresponds to connection $4-f_1$ in Fig. 2.

Generator $A_3$ (Fig. 6) has three inputs $d_3$, $e_3$, $f_3$ and outputs $S_3$, 22 and $\bar{S}_3$ which, as will be seen below, are quite comparable respectively to inputs $d_2$, $e_2$, $f_2$ and outputs $S_2$, 20 and $\bar{S}_2$ of generator $A_2$. It has been stated above that input $d_3$ is connected to output wire 20 of generator $A_2$ and that input $e_3$ is connected to generator 16. Input $f_3$ is connected to output $\bar{S}_4$ of generator $A_4$ through line 30—31. This connection corresponds to the connection $8-f_3$ in Fig. 2.

Output wire 22, which is one of the twin outputs of $A_3$ is connected to input $d_4$ of generator $A_4$ through delay line 32 which does not appreciably differ from delay lines 24 and 25. The output wire 22 delivers the impulse trains $B_3$. Output $\bar{S}_3$ is, as has been said above, connected to input $f_2$ of generator $A_2$.

Generator $A_4$ has, as in Fig. 2, three inputs $f_4$, $e_4$, $d_4$ and two outputs $S_4$ and $\bar{S}_4$. It has been explained above that input $d_4$ is connected to output wire 22 of generators $A_3$ and that input $e_4$ is connected to genererator 16. Input $f_4$ is connected to output $\bar{S}_1$ of generator $A_1$ by line 33, 34. As has been said above, output $\bar{S}_4$ is connected to input $f_3$ of generator $A_3$.

It will be seen hereafter that the similarity established between Fig. 2 and Figs. 5–6 is again born out with respect to generator $A_1$ which has four inputs $b$, $c$, $e_1$, $f_1$, and three outputs $S_1$, 18 and $\bar{S}_1$. Input $b$ is connected to output $\bar{S}_3$ of generator $A_3$ by line 35, 36, 26. Input $c$ is connected to output $\bar{S}_2$ of generator $A_2$ by line 37, 29, 28. It is already known that input $e_1$ is connected to generator 16, that input $f_1$ is connected to output $\bar{S}_2$ of generator $A_2$ and that output wire 18 is connected to input $d_2$ of generator $A_2$.

By way of example and with the help of Fig. 1, the set-up and operation of generator $A_3$ (Fig. 6), which are quite similar to those of the other generators, will now be described. This generator $A_3$ mainly includes a pentode of which the input circuit 39, 40, 41, 42, 43, across control grid 44 and cathode 43, is connected to three inputs $d_3$, $e_3$, $f_3$. The output circuit 45, 46, 47, 48, 49, across plate 45 and screen grid 49 of the pentode, includes the primary winding $50a$ of a transformer with three secondary windings $50b$, $50c$ and $50d$. The rotational directional directions and the external connections of the transformer windings are such that when a negative-going pulse appears across primary winding $50a$, a negative-going pulse is available across secondary winding $50b$ and a positive-going pulse is available across each of the other secondary windings $50c$ and $50d$. Windings $50c$ and $50d$ are connected by their upper terminals to tap $s_5$ of source S through line $55-s_5$. The set-up of pentode 38 is characterized by the fact that it comprises a positive feedback circuit 52, 53, 54, $50d$, 55, $s_5$ which includes resistor 54 and winding $50d$ already mentioned. The voltage at terminal 53, which is grounded through a voltage limiter 99 including a rectifier cell $99a$ and a source $99b$ of E. M. F. equal to $+V_4$, cannot exceed the value $+V_4$. A resistor 56 in the cathode circuit provides a grid-bias voltage aproximately equivalent to the voltage of battery $99b$. Plate circuit 45, 46, 47, 48, 49 of pentode 38 is connected at point 46 to the cathode of diode 77, the plate of which is connected through connection $59-s_3$ to intermediate tap $s_3$ of source S. Through connection 47—60, this circuit is also linked, to one of the plates of a double diode 61 of which the cathode is connected, to the positive terminal $s_1$ of source S through line $62-s_1$. Lastly, this same plate circuit is linked to intermediate tap $s_2$ of source S, through connection $48-78-s_2$. It can be seen that the voltage at point 46 of the plate circuit can neither be lower than $+V_3$ nor higher than $+V_1$ without, in the first case, setting diode 77 into operation and, in the second case, setting diode 61 into operation. Actually, while in operation, the internal resistance of these diodes is negligible. The control grid of pentode 38 may receive a positive voltage (1) from gate 63 through the crystal diode 64; (2) from buffer 66 through the crystal diode 66b; (3) from the positive feedback circuit through the wire between points 53 and 52. Gate 63 is composed of crystal diodes 63a, 63b and of resistor 68; buffer 66 is composed of crystal diodes 66a, 66c, 66b and of resistor 67.

Before studying the operation of generator $A_3$, it is worth to note that generators $A_1$, $A_2$ and $A_4$ are set up like $A_3$ and that consequently maximum and minimum voltages at their outputs are the same as those of the corresponding outputs of generator $A_3$.

It has been pointed out above that pilot impulses have two levels respectively equal to $-V_5$ and $+V_4$. When generator $A_3$ does not generate any timing pulse, the output voltage of winding 50b is equal to $+V_4$. The limitation by diodes 77 and 61 of the E. M. F. induced into winding 50b by a positive impulse applied at input 39 of pentode 38 is such that the voltage at the output $\bar{S}_3$ of this winding cannot be lower than $-V_5$. Voltage limiters 72, 74, 75, each comprising a rectifier element indexed $a$ and a source indexed $b$ supplying a constant voltage $+V_4$, respectively ground the outputs of delay lines 25, 32 and 24. Thus $B_2$ impulses arriving at $d_3$ and delayed by $1.5t$ due to delay line 25 also vary between the same levels $-V_5$ and $+V_4$ as the pilot impulses, since the winding which produces them is subject to the same voltage $-V_5$ as winding 50d of generator $A_3$.

Impulses $\bar{B}_4$, received at input $f_3$, vary between the same levels $+V_4$ and $-V_5$ as impulses $B_3$ supplied by winding 50b. If it is assumed that the four generators $A_1-A_4$ are suitably connected to power sources, among which only source S is shown by Fig. 6, and that pilot pulse generator 16 is inoperative, none of these generators can deliver timing pulses. In these conditions, in the generator $A_3$, for instance, the inputs $d_3$ and $e_3$ are at potential $-V_5$ and input $f_3$ at potential $+V_4$. By reason of the characteristics of gate 63, terminal 39 is at a potential slightly under $-V_5$ and, by reason of the characteristics of the buffer 66, the terminal 65 is at a potential slightly under $+V_4$. Due to the values of the voltages $+V_2$, of tap $s_2$ of source S, and $-V_6$, at the lower terminal of this source, which are respectively applied at terminals 69 and 40 of lines 69, 68, 64, 39, 65, 40, a plate to cathode current of very small intensity flows in pentode 38 when the above mentioned system is at rest.

In order to explain how the pulses of one timing train are generated, it will be assumed that the timing generator unit is already set into normal operation, under control of the pilot pulse generator 16. Figures 1, 5 and 6 will be referred to. For instance, considering the operation of generator $A_3$, it may be seen that, at a time $1.5t$ after the instant $t_2$ of front edge of pilot pulse $n+1$, input $d_3$ (Fig. 6) receives a positive pulse derived from the preceding timing pulse $B_2$ through delay network 25 (Fig. 5). A little time after, that is at instant $t_4$, input $e_3$ receives the pilot pulse $n+2$, thus setting gate 63 in a transmitting condition. The positive pulse transmitted through diode 64 to the control grid 44 of pentode 38 makes the latter heavily conducting. The resulting flow of anode current causes a negative-going pulse to appear across the primary winding 50a, the potential of anode 45 not dropping, however, below voltage $+V_3$, due to limiting diode 77. Consequently induced pulses appear across the secondary windings. Specially a positive timing pulse $B_3$ is available on output wire 22 of winding 50c. A negative pulse induced across secondary winding 50b causes output $\bar{S}_3$ to be brought at potential $-V_5$. A positive pulse induced across secondary winding 50d also permits the application of a positive voltage to the control grid through 54, 53 and 52, although its amplitude is lessened by resistor 54.

When the pilot pulse $n+2$ ceases at instant $t_5$ gate 63 assumes its blocking condition. However during the gap between pilot pulses $n+2$ and $n+3$, a positive voltage is still maintained upon the control grid of the pentode because this voltage is transmitted through diode 66b and diode 66c of buffer 66 from input $f_3$. As a matter of fact, as long as a timing pulse $B_4$ is not produced, the voltage of output $\bar{S}_4$ remains positive. Thereafter a positive voltage is still maintained upon the control grid of the pentode, said voltage resulting from the pilot pulse $n+3$ transmitted through diodes 66b and 66a of buffer 66 from input $e_3$.

When the pilot pulse $n+3$ ceases at instant $t_7$, the timing pulse $B_3$ can no longer be continued because at this time all the inputs of the gating devices of $A_3$ receive negative voltages. Although a positive voltage is still transmitted at this instant to the control grid by the feedback circuit, this voltage vanishes through diodes 66b and 66c, since now output $\bar{S}_4$ is at a negative potential.

It is to be observed that the feedback circuit in each timing generator represents only a security device against the possible impairings in the form of the pilot pulses. For instance if the duration of a pilot pulse were accidentally shortened, the feedback voltages would prevent the voltage on the control grid to drop substantially below voltage $+V_4$.

As it is desired that generator $A_1$ be the first to start operating at the outset of the operation, the gating devices controlling its input have starting conditions which differ from those for all the other generators.

As may be seen from Fig. 1, the starting condition for generator $A_1$ can be that both generators $A_2$ and $A_3$ be not emitting timing pulses. This condition, which is valid at the beginning of the operation, is still valid in the course of the normal operation of the generator unit.

In the timing pulse generator $A_1$ the "and" gating device which controls its input has a structure and a manner of connection which differ from those of the three other generators. All its other elements are similar to those of the other generators.

Said "and" gating device or gate 86 has three inputs $c$, $b$ and $e_1$, and comprises the diodes 86c, 86b and 86a. The output of gate 86 is connected through diode 93 and wire 71, 96 to the control grid of pentode 85. The input $c$ is connected through the link 37, 29 and 28 (Fig. 5) to the inverted output $\bar{S}_2$ of generator $A_2$. The input $b$ is connected through the link 35, 36, 26 (Fig. 5), 27 (Fig. 6) to the inverted output $\bar{S}_3$ of generator $A_3$. The input $e_1$ receives the pilot pulse train due to its connection to pilot pulse generator 16, through link 16b, 17.

The "or" gating device or buffer 89 comprises the diodes 89a, 89b, 89c whose connections are identical to those for the other generators.

It is again assumed that the four generators $A_1-A_4$ are suitably connected to power sources. When pilot pulse generator 16 begins to supply pilot pulses to the inputs of the four generators, only gate 86 of generator $A_1$ can assume a pulse transmitting condition. As a matter of fact, at the instant $t_0$ when the pilot pulse $n$ reaches the inputs $e_1-e_4$, inputs $b$ and $c$ of generator $A_1$ receive a positive voltage $+V_4$, while inputs $d_2$, $d_3$ and $d_4$ respectively of generators $A_2$, $A_3$ and $A_4$ receive a negative voltage $-V_5$, since no timing pulse has yet been generated.

Thus one first timing pulse of train $B_1$ can appear at the normal output terminal $S_1$ of generator $A_1$. The sustaining of the voltage level and stoppage of this timing pulse are performed by the buffer 89 under conditions equivalent to those described when explaining the operation of generator $A_3$.

This first pulse $B_1$, when transmitted with a delay of $1.5t$ to the input $d_2$ of generator $A_2$, constitutes the starting condition for the second generator to become operative upon reception of the following pilot pulse $n+1$. Thereafter the sequential operation of the four generators can go on normally.

The special connection of the "and" gating device of generator $A_1$ is intended to avoid the use of an external device for automatically starting this generator before the others. In other embodiments the number N of generators in the timing generator unit could be smaller or greater than four. As a rule the inputs of said gating device should comprise, besides an input for receiving the pilot pulses, $N-2$ inputs to be connected respectively to the inverted outputs of all the generators, the first and the latest of the series excepted.

Needless to say that the manner of realization represented in Figs. 5-6 is but an unrestrictive example and that the Fig. 4 diagram may be practically realized in many other ways within the scope of the invention. In particular the "and" gating device 86 associated in the present example with generator $A_1$ may be included in any one of the other three. If it is included in generator $A_2$, for example, inputs $b$ and $c$ of the latter must be connected to outputs $\bar{S}_4$ and $\bar{S}_3$ respectively and output 18 of generator $A_1$ must be eliminated. Generator $A_1$ will receive delayed impulses $S_4$ through an input $d_1$ not shown. The same block diagram may be readily applied to a system composed of $n$ impulse generators provided the period of recurrence $p$ of the pilot impulses be equal to $T/n$ instead of $T/4$ as above. The duty cycle of the timing impulses will then be equal to $3/2n$ and one of the generators, whatever its rank $r$, will be associated with a locking device similar to gate 93 of generator $A_1$ in Fig. 5. Fig. 7 shows a part of the impulses for a system comprising 5 generators $A_1$ to $A_5$, the first of which is locked by impulses $\bar{B}_2$, $\bar{B}_3$ and $\bar{B}_4$. An impulse generating system according to the invention may be especially used in electronic computing machines of the series type for the control of the different stages in the elementary operations for addition and subtraction. The impulse generating system which has been described above may be used advantageously in computing machines operating by electric impulses. These impulses called numerical impulses, must always coincide with one of the above defined timing impulses.

I claim:

1. Pulse generator unit for generating an integer number N of shifted timing pulse trains having a common recurrence cycle of duration T and being shifted in time with one another by a fraction $T/N$ of their recurrence cycle, comprising a same number N of timing pulse generators; each generator including an electron discharge tube having a control electrode and an output electrode, a transformer having a primary winding connected to said output electrode, a normal output winding and an inverted output winding for respectively delivering a normal pulse and an inverted pulse whenever said control electrode is energized, a coincidence circuit with a first input, a second input and an output terminal for delivering a control signal only when its both inputs are energized, an "or" gating circuit with a first input, a second input and an output terminal for delivering a control signal upon energization of either or both of its inputs, and connections for transmitting the control signals from said coincidence circuit and said "or" gating circuit to said control electrode; connections in each generator for applying to the first inputs of said coincidence circuit and "or" gating circuit pilot pulses having a repetition period equal to said fraction $T/N$; and connections for mutually interconnecting said N generators in series-chain form in such a manner that, in one $n$'th generator the second input of its coincidence circuit is connected to the normal output of the transformer in the $n-1$'th generator in the series through a delay circuit with a delay time at least equal to the duration of one of said pilot pulses and that in the same $n$'th generator the second input of its "or" gating circuit is connected to the inverted output of the transformer in the $n+1$'th generator in the series.

2. Pulse generator unit as claimed in claim 1, wherein each of said generators comprises a further winding in said transformer and a regenerative feedback connection between said further winding and said control electrode so as to maintain the energization level of the latter in case of voltage variations during the gap between two consecutive pilot pulses.

3. Pulse generator unit for generating an integer number N of shifted timing pulse trains having a common recurrence cycle of duration T and being shifted in time with respect to one another by a fraction $T/N$ of their recurrence cycle, comprising a same number N of timing pulse generators; each generator including an electric valve arrangement having a control input, a normal output and an inverted output for respectively delivering a normal pulse and an inverted pulse whenever said control input is energized, a coincidence circuit with a first input, a second input and an output terminal for delivering a control signal only when its both inputs are energized, an "or" gating circuit with a first input, a second input and an output terminal for delivering a control signal upon energization of either or both of its inputs, and connections for conveying the control signals of said coincidence circuit and said "or" gating circuit to said control input; connections in each generator for applying to the first inputs of said coincidence circuit and "or" gating circuit pilot pulses having a repetition period equal to said fraction $T/N$; and connections for mutually interconnecting said N generators in series-chain form including a connection between the second input of said coincidence circuit of a given one of said generators and the normal output of the preceding generator in the series, said connection being made through a delay element with a delay time at least equal to the duration of one of said pilot pulses, and a connection between the second input of said "or" gating circuit of said given generator and the inverted output of the succeeding generator in the series, and similar connections for the other generators in the series.

4. Pulse generator unit as claimed in claim 3 wherein each of said generators has a regenerative feedback connection linking a point of said electric valve arrangement to the output terminal of said "or" gating circuit in the same generator so as to compensate for the eventual voltage variation over said control input during the gap between two consecutive pilot pulses.

5. Pulse generator unit for generating an integer number N of shifted timing pulse trains having a common recurrence cycle of duration T and a time shift with respect to one another of a fraction $T/N$ of their recurrence cycle, comprising in combination a same number N of timing pulse generators; each generator including an electric valve arrangement provided with a control element, a normal output terminal and an inverted output terminal respectively responsive in opposite directions to the energization of said control element by delivering complementary pulses, an "or" gating circuit with a first input, a second input and an output terminal for delivering a control signal upon energization of either or both of its inputs, a coincidence circuit with a first input, a second input and an output terminal for delivering a control signal only when both its inputs are energized, the first inputs of both circuits receiving a common train of pilot pulses having a repetition period equal to said time shift, the output terminals of both circuits being connected to said control element; and interconnections arranged to couple said generators as a series-ring circuit in which, for a generator considered as the $n$'th in the series, a connection links the second input of the corresponding "or" gating circuit to the inverted output terminal of the $n+1$'th the generator in the series and another connection links the second input of the coincidence circuit in the generator considered to the normal output terminal of the $n-1$'th generator in the series, the latter connection including a time delay network with a delay time at least equal to the duration of one of said pilot pulses and smaller than said time shift, so that the generation of a timing pulse by one of said generators is started by one single pilot pulse once in the course of any recurrence cycle, said timing pulse being terminated in relation to the next following pilot pulse.

6. Pulse generator unit for generating an integer number N of shifted timing pulse trains having a common recurrence cycle of duration T and a time shift with respect to one another of a fraction $T/N$ of their recurrence cycle, comprising a series of N timing pulse generators; each generator including an electric valve arrangement having a control input, a normal output and an inverted output for respectively delivering a normal or timing pulse and an inverted pulse whenever said control input is energized, an "or" gating circuit with a first input, a second input and an output terminal for delivering a control signal upon energization of either or both of its inputs, a coincidence circuit with a first input, a second input and an output terminal for delivering a control signal only when all its inputs are energized, the coincidence circuit of the first generator in the series having further inputs, connections for transmitting the control signals from said coincidence circuit and gating circuit to said control input, connections in each generator for applying to the first inputs of said coincidence circuit and gating circuit pilot pulses having a repetition period equal to said time shift; connections for mutually interconnecting said N generators in a series-chain form including, for each generator considered, a connection between the second input of the "or" gating circuit of this considered generator and the inverted output of the succeeding generator in the series, and including for each generator considered, except for the first generator in the series, a connection between the second input of its coincidence circuit and the normal output of the preceding generator in the series, the latter connection comprising a delay circuit with a delay time at least equal to the duration of any of said pilot pulses; and further connections for connecting the second and further inputs of the coincidence circuit of said first generator to the inverted outputs of the $N-2$ following generators in the series respectively, so that only said first generator can generate the first pulse to define the beginning of a recurrence cycle.

References Cited in the file of this patent
UNITED STATES PATENTS

| | | |
|---|---|---|
| Re. 23,579 | Pierce | Nov. 11, 1952 |
| 2,541,932 | Melhouse | Feb. 13, 1951 |
| 2,595,378 | Hertog et al. | May 6, 1952 |
| 2,616,977 | Staal | Nov. 4, 1952 |
| 2,628,309 | Hughes | Feb. 10, 1953 |
| 2,631,194 | Reeves | Mar. 10, 1953 |
| 2,640,921 | Hansell | June 2, 1953 |

OTHER REFERENCES

Article: "Nimrod," by Stuart-Williams, pages 344–348 of Electronic Engineering, for September 1951.

Article: "Diode Coincidence and Mixing . . . Computers," by Chen; pages 511–514 of proceedings of IRE for May 1950.